United States Patent [19]

Yasumatsu et al.

[11] 4,449,752

[45] May 22, 1984

[54] VEHICLE SEAT POSITION CONTROL MECHANISM WITH NEUTRAL MEMORY

[75] Inventors: Jun Yasumatsu, Toyota; Mamoru Mori, Okazaki; Toshihito Nishiwaki; Akira Owada, both of Toyota, all of Japan

[73] Assignee: Toyota Jidosha Kogyo Kabushiki Kaisha, Japan

[21] Appl. No.: 79,567

[22] Filed: Sep. 27, 1979

[30] Foreign Application Priority Data

Mar. 6, 1979 [JP] Japan ............................. 54-28270[U]

[51] Int. Cl.³ .............................................. B60N 1/04
[52] U.S. Cl. .................................................... 297/341
[58] Field of Search .................. 297/341; 248/429, 430

[56] References Cited

U.S. PATENT DOCUMENTS

| | | | |
|---|---|---|---|
| 3,811,726 | 5/1974 | Muraishi et al. | 297/341 |
| 3,940,182 | 2/1976 | Tamura | 297/341 |
| 3,981,473 | 9/1976 | Nagai | 297/341 |
| 4,101,169 | 7/1978 | Muraishi et al. | 297/341 |
| 4,143,911 | 3/1979 | Sakakibara et al. | 297/341 |
| 4,159,147 | 6/1979 | Kiyomitsu et al. | 297/341 |

Primary Examiner—Francis K. Zugel
Attorney, Agent, or Firm—Parkhurst & Oliff

[57] ABSTRACT

A seat position control mechanism with a neutral position return mechanism for a front seat of a vehicle such as two-door sedan or hard top sedan incorporates a memory plate disposed outside the locking teeth of the locking plate of the seat slide adjusting device, a rockable lever journaled with the maneuverable shaft rockably secured to the locking lever, and connecting means connected from the rockable lever to the back rest of the front seat, in addition to the ordinary seat slide adjusting device. The rockable lever is always urged by the rotating force of the torsion spring in the seat locking direction so that the maneuverable shaft can be locked or unlocked regardless of the rockable lever. Thus, the entire mechanism is low bulky, compact and light with simple construction, and the front seat can be smoothly slid without interference with the rockable lever and other members.

4 Claims, 11 Drawing Figures

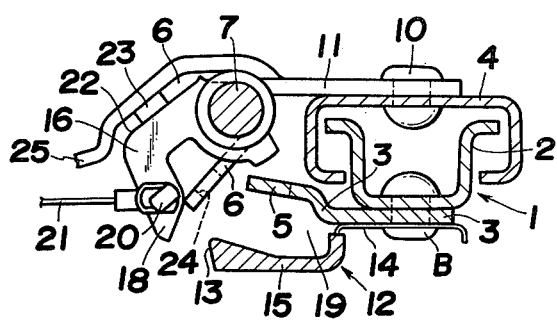
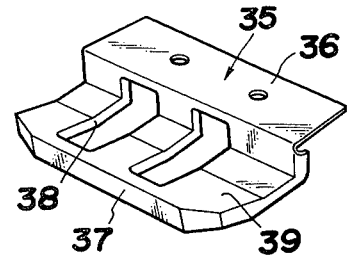
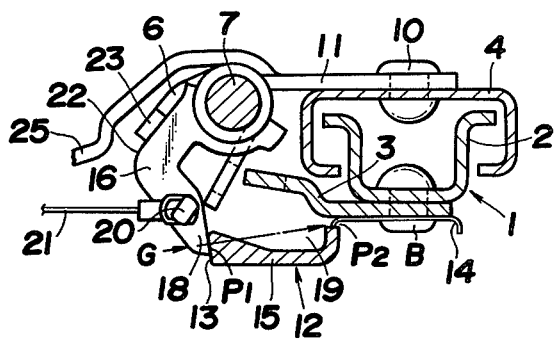
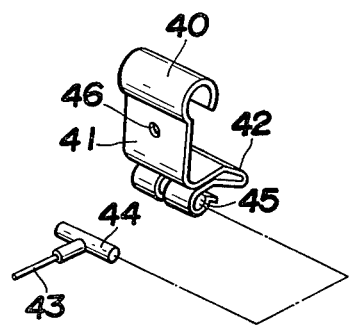
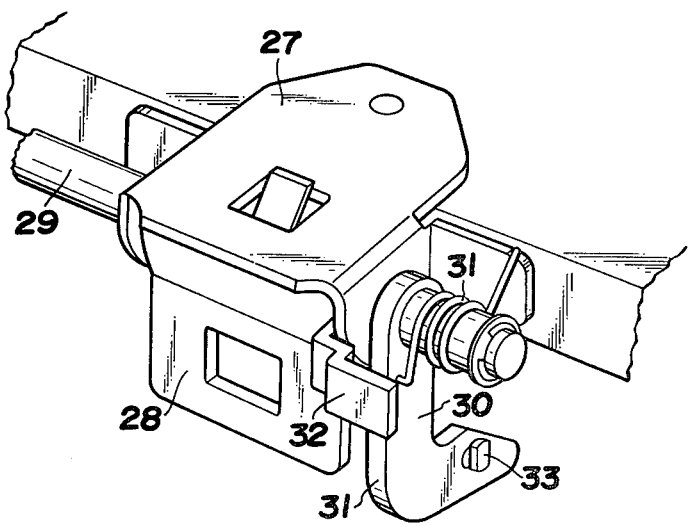

VEHICLE SEAT POSITION CONTROL MECHANISM WITH NEUTRAL MEMORY

BACKGROUND OF THE INVENTION

This invention relates to an automotive front seat for a two-door sedan or hard top sedan and, more particularly, to improvements in a seat position control mechanism attached to the front seat capable of exactly resetting at a neutral position optimum for a driver of standard body shape without losing seat slide adjusting and rear seat passenger exit and entrance functions.

There was already proposed a seat position control mechanism with a memory for storing the seat position selected by a driver to accurately lock the seat always at the stored seat position even when the seat is moved every time passengers of rear seat ride off or in the vehicle. Since this conventional seat position control mechanism must displace the memory itself upon selection of the seat position, it incorporates relatively bulky and heavy construction and cannot disadvantageously be attached to the front seat of low height sedan or hard top sedan.

SUMMARY OF THE INVENTION

If the front seat position accommodates a neutral position adapted for a driver of standard body shape as an optimum seat position in general concept, it can be simply adjusted from the neutral position as a starting point in slight amount in response to the driver's individual body shape difference and preference.

Accordingly, a primary object of the present invention is to provide a seat position control mechanism with a neutral position return mechanism for an automotive seat which can exactly reset the seat at a neutral position in a simple construction instead of the conventional complicated and large walk-in mechanism with a memory.

Another object of the present invention is to provide a seat position control mechanism with a neutral position return mechanism for an automotive seat which can lock the seat at a constant neutral position adapted for a driver of standard body shape as an optimum seat position merely by forwardly tilting the back rest of a front seat, sliding the seat forwardly, then tilting up the back rest and sliding the seat backwardly.

Yet another object of the present invention is to provide a seat position control mechanism with a neutral position return mechanism for an automotive seat which is entirely low bulky, small size and light weight in a simple construction still without losing seat slide adjusting and rear seat passenger exit and entrance functions.

Still another object of the invention is to provide a seat position control mehcanism with a neutral position return mechanism for an automotive seat which can simply be reset elastically to the neutral position after allowing rocking motion of an open lever as the seat locking memory position.

BRIEF DESCRIPTION OF THE DRAWINGS

The above and other related objects and features of the invention will be apparent from a reading of the following description of the disclosure found in the accompanying drawings and the novelty thereof pointed out in the appended claims.

FIGS. 5, 6 and 7 are sectional views of the walk-in mechanism similar to FIG. 4 but showing different operating modes;

FIG. 8 is a partially perspective view of another preferred embodiment of the present invention but showing only the essential parts;

FIG. 9 is a perspective view of another preferred embodiment of the memory plate employed in the seat position control mechanism; and FIG. 10 is a perspective view of another preferred embodiment of the rockable lever used for the seat position control mechanism.

DETAILED DESCRIPTION OF THE PREFERRED EMBODIMENTS

Figure 1:
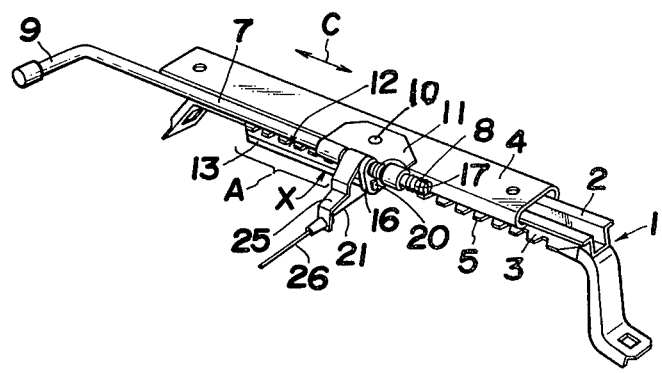
FIG. 1 is a perspective view of one preferred embodiment incorporating the principle of the present invention of the present invention to be installed underneath the front seat of a vehicle.
Figure 2:
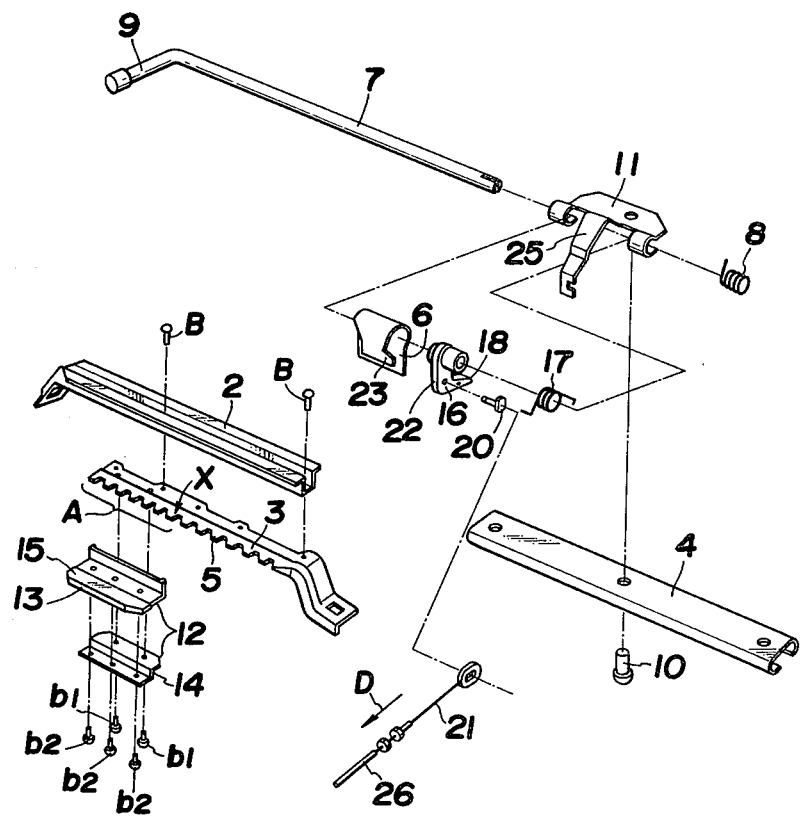
FIG. 2 is an exploded perspective view of the walk-in mechanism shown in FIG. 1.

Referring now to the drawings, particularly to FIGS. 1 and 2 showing one preferred embodiment of the seat position control mechanism with a neutral position return mechanism for an automotive seat constructed according to the present invention, wherein like reference numerals designate the same parts in the following views, a front seat track 1 for slidably carrying a front seat (not shown) consists of a lower rail 2, a locking plate 3 secured to the lower rails 2 by a plurality of rivets B (FIG. 2), and an upper rail 4 slidably carried on the lower rail 2 in the direction designated by an arrow C for bearing a front seat cushion frame (not shown).

There are also provided a plurality of locking teeth 5 integrally with the locking plate 3, and a locking lever 6 secured to a maneuverable shaft to be engaged with the locking teeth 5 at the upper rail 4 side for locking the front seat (not shown) in such a manner that the shaft 7 is always rotatably urged by means of rotating force of a torsion spring 8 in the locking direction as will be hereinafter described in greater detail.

A handle portion 9 is integrally formed with the maneuverable shaft 7. When the handle portion 9 is rotated rockably against the tension of the torsion spring 8, the maneuverable shaft 7 is rockably rotated to an unlocking position where the locking lever 6 is disengaged from the locking teeth 5 of the locking plate 3. When the handle portion 9 is released from the tension of the torsion spring 8, the shaft 7 is rockably rotated by the tension of the torsion spring 8 to the locking position where the locking lever 6 is engaged with the teeth 5 of the locking plate 3.

A bracket 11 is secured to the upper rail 4 by means of a rivet 10 (FIG. 2) for holding the locking lever 6 and the maneuverable shaft 7 at predetermined position as shown.

A memory plate 12 is so secured to the locking plate 3 by means of a plurality of screws $b_1$ (FIG. 2) in the zone A of the locking teeth 5 of the locking plate 3 as to start from a neutral position X of the front seat (not shown) toward the forward portion of a vehicle. The memory plate 12 is disposed at one side end 13 thereof outside the locking teeth 5 of the locking plate 3, and is also secured at the same side portion integral with thin elastic steel base plate 14 to a rigid side plate 15 of the structure not elastically deformed by means of screws $b_2$, welding or calking or the like.

Figure 4:
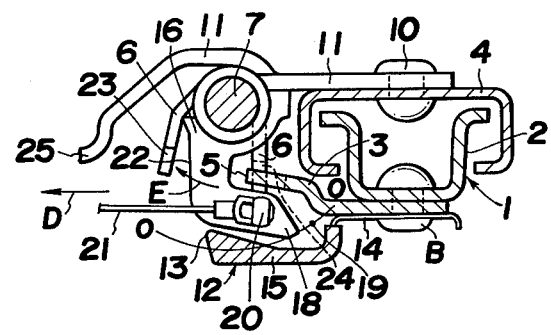
FIG. 4 is a side sectional view of the preferred embodiment taken substantially through the lines IV—IV of FIG. 3.
Figure 11:
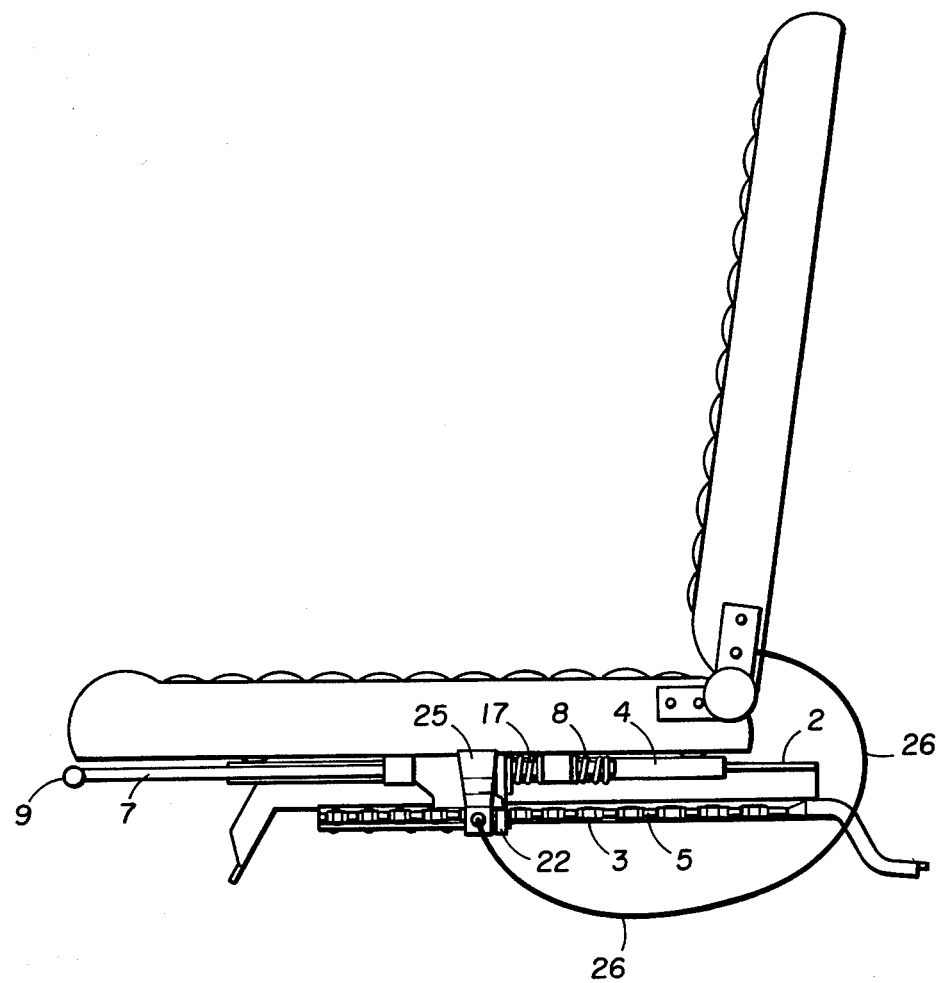
FIG. 11 is a side view of one preferred embodiment of the present invention installed beneath the front seat of a vehicle.

A rockable lever 16 is rockably journaled adjacent to the locking lever 6 with the maneuverable shaft 7 in such a manner always rotatably urged by means of rotating force of a torsion spring 17 interposed between the lever 16 and the bracket 11 in the locking direction. This rockable lever 16 is, as obviously shown in FIG. 4, disposed at the end 18 thereof within the gap 19 opposite to the side plate 15 of the memory plate 12 from the locking plate 3 so that the side end 13 of the memory plate 12 is located within the roatating trace 0 - 0 of the end 18 thereof. As shown in FIG. 11, a cable and sheath mechanism 26 is connected through a pin 20 to cable and sheath mechanism a linkage of any type with the back rest of the front seat. As shown in FIG. 4, when the back rest of the front seat is forwardly tilted, the wire 21 the cable and sheath is pulled by a towing force in the direction designated by an arrow D to thereby rockably rotate the rockable lever 16 in the direction designated by an arrow E in unlocking direction. When the back rest of the front seat is returned to the original state, the towing force of the wire 21 is released to allow the rockable lever 16 to rockably rotate by means of the tension of the torsion spring 17 in locking direction.

Figure 5:
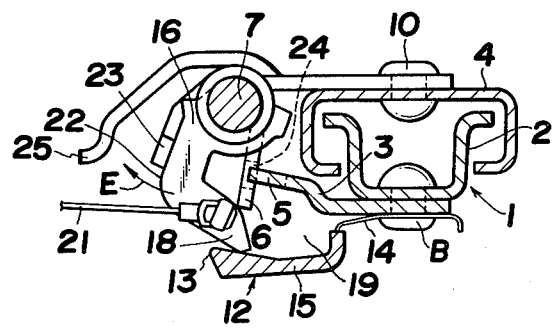

As particularly referred to FIG. 5, when the rockable lever 16 is rotated in the direction of the arrow E, the end 18 of the lever 16 pushed the inside surface of the side plate 15 of the memory plate 12 within the gap 19 formed between the side plate 15 and the locking plate 3 to thereby elastically bend the base plate 14. Thus, the end 18 of the rockable lever 16 is rockably moved, as specially shown in FIG. 6, out of the memory plate 12 to permit the memory plate 12 to return to its original position.

A lug 23 is integrally extended from the locking lever 6 toward the back surface 22 of the rockable lever 16 adjacent to the lever 6 in a manner elastically making contact with the back surface 22 of the lever by means of the tension of the torsion spring 8. When the rockable lever 16 is rotated in the direction of the arrow E as described above, the back surface 22 of the rockable lever 16 simultaneously pushed to rotate the lug 23 of the locking lever 6 in the direction of the arrow E to thereby allow the locking lever 6 to rockably rotate with the maneuverable shaft 7 against the tension of the torsion spring 8 in the direction of the arrow E.

Figure 3:
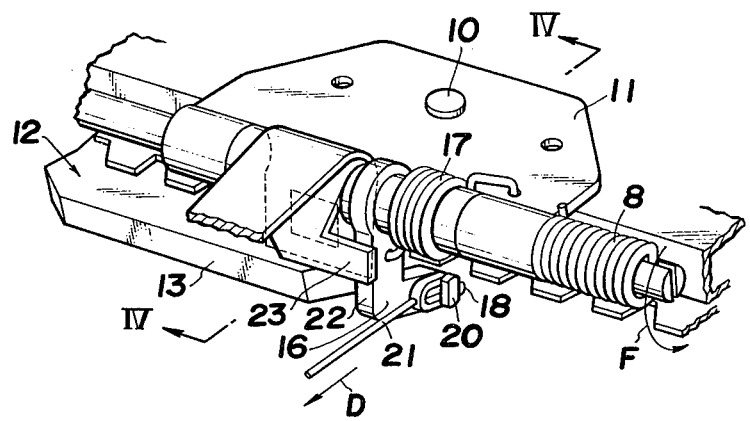
FIG. 3 is a partially perspective view of the essential parts of the walk-in mechanism shown in FIG. 1.

The locking lever 6 is always urged rotatably by means of the tension of the torsion spring 8 in the direction designated by an arrow F (FIG. 1) in the locking direction where the teeth 5 of the locking plate 3 are engaged with locking hole 24 perforated at the locking lever 6 in normal state as shown in FIGS. 3 and 4 to thereby lock the front seat position.

When the rockable lever 16 is rotated as described previously, the locking lever 6 which normally locks the front seat through the engagement of the teeth 5 of the locking plate 3 with the locking hole 24 as shown in FIG. 3 and, is rockably rotated to the unlocking state for releasing the locked front seat. Thus, the rockable lever 16 is rockably rotated upon towing of the wire 21 in the direction of the arrow E in the unlocking direction in the range from the locking position shown in FIG. 4 of the locking lever 6 to the unlocking position where the teeth 5 of the locking plate 3 is disengaged completely from the locking hole 24 of the locking lever 6 and the end 18 of the rockable lever 16 is moved out of the side end 13 of the memory plate 12 as referred to FIG. 6.

It is noted that, when the end 18 of the rockable lever 16 makes contact with the side end 13 of the memory plate 12 from the outside, the side end 13 of the memory plate 12 disposed outside of the teeth 5 of the locking plate 3 is so disposed within the rotating trace 0 - 0 of the end 18 of the rockable lever 16 that the back surface 22 of the rockable lever 16 may retain the locking lever 6 in the disengaged position as described previously.

The seat position control mechanism thus constructed according to the present invention will operate as below.

The memory plate 12 is so disposed at one end thereof in the seat position control mechanism of the present invention in advance as to face with the teeth 5 of the locking lever 3 at the neutral position X of the front seat. In addition, the front seat (not shown) is normally locked at desired position of a driver at forward position of the vehicle body from the memory plate 12 by manipulation of the maneuverable shaft 7 via the handle portion 9.

When the back rest of the front seat is forwardly tilted down for passengers to exit or enter the rear seat in the above described state of the seat position control mechanism, the wire 21 is towed in the direction of the arrow D to thereby rockably rotate the rockable lever 16 in the direction of the arrow E from the state shown in FIG. 4 to the state shown in FIG. 5.

The rockable lever 16 thus rotated elastically urges at the end 18 thereof the side end 13 of the memory plate 12 downwardly to thereby elastically deform the base plate 14 integral with the memory plate 12 and simultaneously pushes the lug 23 of the locking lever 6 via the back surface 22 thereof in the direction of the arrow E to thereby rockably rotate the locking lever 6 from the locking position with the locking plate 3 to the unlocking position. As the wire 21 is further towed to further rockably rotate the rockable lever 16, the lever 16 sufficiently elastically deforms at the end 18 thereof the memory plate 12 to finally move at the end 18 thereof out of the side end 13 of the memory plate 12 as described previously. Thus, since the rockable lever 16 is rockably moved in the range from the locking position of the locking lever 6 to the unlocking position, the locking lever 6 is completely disengaged at the locking hole 24 thereof from the locking plate 3 at the teeth 5 and the rockable lever 16 is moved at the end 18 thereof out of the side end 13 of the memory plate 12 as illustrated in FIG. 6.

Since the conventional seat slide adjusting mechanism incorporates a helping spring for urging the front seat forwardly upon unlocking of the front seat as matters of common knowledge, the front seat is pushed forwardly when the seat position control mechanism is operated to become the state shown in FIG. 6 to thus integrally move forwardly the locking lever 6 and the rockable lever 6 secured through the bracket 11 to the upper rail 4.

The towing force of the wire 21 is released when the back rest of the front seat is moved back for the driver to ride in the front seat after the passengers exit or enter the back seat. The rockable lever 16 returns to the state shown in FIG. 7 from the state illustrated in FIG. 6 by means of the torsion spring 17 and the torsion spring 8 urging on the back surface 22 thereof. The memory plate 12 is now disposed at the side end 13 thereof outside the teeth 5 of the locking plate 3 and in the zone A, which is away from the neutral position X of the locking plate 3 and toward the forward direction of the vehicle, as was heretofore described. The rockable lever 16 contacts the end 18 with the side end 13 of the memory plate 12 so that it is retained at the position where the locking lever 6 is also retained this is at the position disconnected from the locking teeth 5 of the locking plate 3.

When the front seat is pushed backwardly in the state shown in FIG. 7, the rockable lever 16 slidably moves at the end 18 along the side end 13 of the memory plate 12. When no side end 13 of the memory plate 12 existed at the neutral position X as the rockable lever 16 further slidably moves at the end 18 along the locking plate 3, both the rockable lever 16 and the rocking lever 6 are rockably rotated to the position shown in FIG. 4 by means of the torsion springs 17 and 8, respectively. The locking lever 6 is now engaged at the locking hole 24 with the locking teeth 5 of the locking plate 3 to allow the front seat to be locked at the neutral position. When the driver slidably moves the front seat to his desired position thereafter and manipulates to rotate the maneuverable shaft 7 via the handle portion 9 to lock the seat, only the locking lever 6 is rotated in unlocking direction to thereby disengage the locking plate 3 from the locking lever 6 to allow the front seat and accordingly the upper rail 4 to freely move as desired. If the driver releases the handle portion 9 at the position desired to lock the front seat, the maneuverable shaft 7 and accordingly the locking lever 6 is rockably rotated in the locking direction by the tension of the torsion spring 8 to thereby lock the lever 6 or engage the lever 6 with the teeth 5 of the locking plate 3 at the position.

Since the rockable lever 16 is disposed at the end 18 within the gap 19 between the locking plate 3 and the memory plate 12 during the above described operation as shown in FIG. 4 for the locking plate 3 not to interfere the memory plate 12 therebetween, it can move to the locking position together with the locking lever 6.

If the position for locking the front seat is located at the position backward of the vehicle from the neutral position X before starting the aforementioned series of operations of the seat position control mechanism, the rockable lever 16 does not urge to elastically bend at the end 18 thereof the memory plate 12, but both the locking lever 6 and the rockable lever 16 rockably rotate from the state shown in FIG. 4 directly to the state illustrated in FIG. 6. As the front seat (not shown) is pushed forwardly by the spring of the seat slide adjusting mechanism to permit the rockable lever 16 to rockably rotate at the end 18 thereof to move out of the side end 13 of the memory plate 12 and to then move to the state shown in FIG. 7 upon standing of the back rest of the front seat.

As depicted in FIG. 7, force G at the end 18 of the rockable lever 16 is directed toward the side end 13 of the memory plate 12 by means of the torsion springs 8 and 17 when the lever 16 makes the end 18 thereof contact with the side end 13 of the memory plate 12. This force is coincident to the rectilinear line from the contacting point $P_1$ to the connecting point $P_2$ of the base plate 14 but does not elastically bend the memory plate 12.

Referring back to FIGS. 1 and 2, a nose 25 extended from the bracket 11 is a supporting member for supporting the guide tube 26 of the wire 21.

FIG. 8 shows another preferred embodiment of the seat position control mechanism of the present invention. This embodiment comprises a bracket 27 corresponding to the bracket 11 in the first embodiment, a locking member 28 which corresponds to the locking lever 6 and is pivotally secured to the bracket 27, a maneuverable shaft 29 for rockably rotating the locking member 28, a rockable lever 30 rockably journaled with the shaft 29 so that it is always urged in the locking direction by a torsion spring 31, a lug 33 integrally extended from the locking member 28 to make contact with the back surface 32 of the rockable lever 30, and a projection 34 integrally projected from the rockable lever 30 for connecting to a wire of the same function as the wire 21 in the first embodiment shown in FIGS. 1 and 2. The locking member 28 and the rockable lever 30 operate entirely the same way as the rocking lever 6 and the rockable lever 16 in the first embodiment.

FIG. 9 shows another preferred embodiment of the memory plate used for the seat position control mechanism of the present invention. This memory plate 35 is made of one thin elastic steel plate, and consists of an elastically bendable base plate portion 36, and a rigid side plate portion 39 formed by bending peripheral edges 37 and 38 in flange state. One of the peripheral edges 37 makes contact with the end of the rockable lever 16 of the first embodiment.

FIG. 10 shows another preferred embodiment of the rockable lever used for the walk-in mechanism of the present invention. This rockable lever is made of one metal plate which works by bending, and consists of a bearing portion 40 engaged with the maneuverable shaft, a doby 41, an end 42, an engaging groove 45 formed at the body 41 for engaging the attachment end 44 of a wire 43, and a connecting hole 46 perforated at the body 41 for connecting the end of the torsion spring to thus operate in the same way functions as the rockable lever in the respective embodiments.

It should be understood from the foregoing description that the seat position control mechanism of the present invention thus constructed and operated merely comprises, in addition to the ordinary seat slide adjusting device, a locking plate and a locking lever, a memory plate secured to the locking plate, a rockable lever rockably journaled with the maneuverable shaft of the locking lever, a connecting member for rockably rotating the rockable lever in cooperation with the tilting movement of the back rest of the front seat, and torsion springs for always urging the rotating force of the above levers. The entire mechanism is low bulky, compact, and light with simple construction.

It should also be appreciated that, since the rockable lever is rockably journaled with the maneuverable shaft of the locking lever and is always urged by the rotating force of the torsion spring in the locking direction, the maneuverable shaft for manipulating the locking lever can be locked or unlocked regardless of the rockable lever as the rockable lever is disposed at the end thereof within the gap between the locking plate and the memory plate, the front seat can be smoothly slid without any interference with the rockable lever and other members to so that no other original seat slide adjusting and rear seat passenger entrance and exit functions are lost.

It should also be understood that since the memory plate is made of elastic steel plate, it functions to elastically return itself to the original position and prohibits to the rockable lever from returning to its original position after the rockable lever is allowed to be rockably rotated by means of the elastic bending of the memory plate. To guide the rockable lever along the side end of the memory plate and to allow the rockable lever to return to the original position, where no side end of the memory plate exists, the seat locking position can be memorized by the memory plate where the side end thereof ends. The front seat is thus simply and exactly returned to the neutral position where it is locked.

What is claimed is:

1. A neutral position return mechanism for a vehicle seat having a seat track including a lower rail, a locking plate secured to the lower rail, an upper rail slidably carried on the lower rail, a locking lever engageable with a series of locking teeth of the locking plate and a maneuverable shaft fixedly secured to the locking lever which is always rotatably urged by the rotating force of a torsion spring in a seat locking direction comprising:

a memory member, elastically disposed at a side end thereof and outside the locking teeth of the locking plate, extending along the zone of the locking teeth of the locking plate from a neutral position of the seat toward the forward portion of the vehicle, said memory member being spaced from said locking plate so that a gap is formed between said memory member and said locking plate, a rotatable member rotatably journaled with the maneuverable shaft and disposed at the end thereof within the gap between said memory and the locking plate so that the side end of said memory member is located within a rotating trace of said rotatable member at positions along the length of said locking plate, and a connecting means between said rotatable member and a back of said vehicle seat for rotating said rotatable member against a biasing force of said torsion spring in a disengaging direction upon forward tilting of the back of said vehicle seat, said rotatable member being rotatable by movement of said connecting means in a disengaging direction from a locking position of the locking lever, where it engages the locking teeth of said locking plate, to a disengaged position, where the locking lever is disengaged from the teeth of the locking plate and the end of the rotatable member moved out of said side end of said memory member, and said memory member being disposed at said side end thereof outside the teeth of the locking plate and disposed within the rotating trace of the end of said rotatable member so that the surface of said rotatable member nearest said locking lever retains the locking lever in the disengaged position when the end of said rotatable member contacts the outside of said side end of said memory member.

2. A vehicle seat control mechanism in accordance with claim 1, further comprising a handle portion integrally formed with the maneuverable shaft for drivably rotating the maneuverable shaft to a position where the locking lever is disengaged from the locking teeth of said locking plate.

3. A vehicle position control mechanism in accordance with claim 1, further comprising a lug member integrally adjacent to and extending from the locking lever toward the surface of said rotatable lever nearest said locking lever so that the lug elastically contacts the surface of said locking lever nearest said locking lever by means of the tension of the torsion spring.

4. A vehicle seat position control mechanism in accordance with claim 1, wherein a locking hole is provided in the locking lever to engage the teeth of the locking plate.

* * * * *